United States Patent [19] [11] 4,235,537

Thompson [45] Nov. 25, 1980

[54] METHOD OF TESTING PHOTOGRAPHIC FILM USING MULTICOLOR SENSITOMETER

[76] Inventor: Darrell T. Thompson, 4356 Blackfoot Dr., Grandville, Mich. 49418

[21] Appl. No.: 872,686

[22] Filed: Jan. 26, 1978

[51] Int. Cl.3 .......... G03B 41/00

[52] U.S. Cl. .......... 354/20

[58] Field of Search .......... 354/20; 356/202, 203, 356/229, 230, 404, 443, 444; 362/34, 84, 98; 313/498, 506; 355/69, 80, 67; 315/174

[56] References Cited

U.S. PATENT DOCUMENTS

| | | | |
|---|---|---|---|
| 3,118,079 | 1/1964 | Lehmann | 315/174 X |
| 3,332,332 | 7/1972 | Blain et al. | 355/69 X |
| 3,496,410 | 2/1970 | MacIntyre | 313/498 X |
| 3,655,972 | 4/1972 | Somerset | 313/498 X |
| 3,698,294 | 10/1972 | Sanford | 354/20 |
| 4,080,075 | 3/1978 | Berg | 356/202 |

OTHER PUBLICATIONS

J. A. Reynolds, "A Portable . . . Source", Lab. Practices, vol. 16, No. 19, Sep. 1967, pp. 1119–1121.

*Primary Examiner*—John Gonzales
*Attorney, Agent, or Firm*—Glenn B. Morse

[57] ABSTRACT

The sensitivity of photographic materials is measured by a device that generates a controlled exposure of light of predetermined color characteristics. Color control is maintained by subjecting an electroluminescent light source to excitation by alternating current voltages at particular frequencies selected with reference to the light souce color response.

2 Claims, 5 Drawing Figures

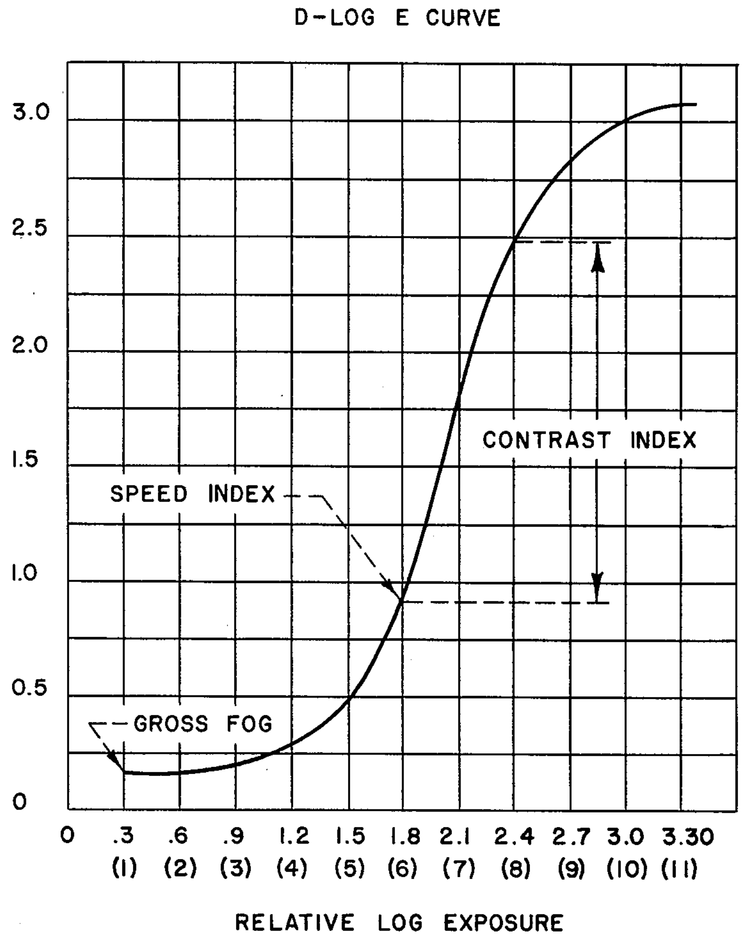
FIG. 3
FIG. 4
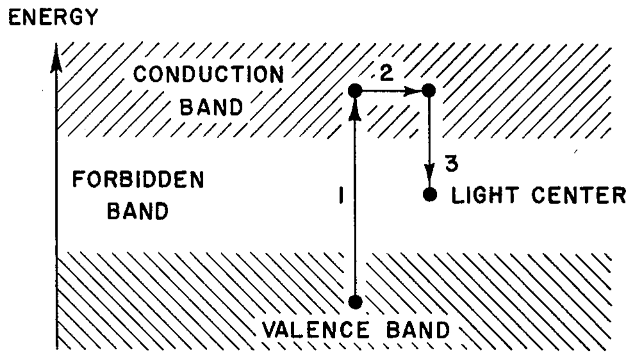

METHOD OF TESTING PHOTOGRAPHIC FILM USING MULTICOLOR SENSITOMETER

BACKGROUND OF THE INVENTION

Sensitometry is the measurement of the sensitivity of photographic materials. A sensitometer is an instrument which gives the photographic material (usually a film) an accurately controlled light exposure. The instrument usually consists of a light source with or without filters, a timing mechanism, and a step wedge of graduated transparency which modulates the intensity of a light exposure in blocks of varying density. The range is from clear to black, usually in incremental steps of 0.3 or 0.15 density. The instrument also includes a means for holding the film during the exposure. "Density" is expressed as the logarithm of the ratio of the incident light on the film to the light transmitted by the film.

Accurately controlled test exposures of film samples are useful in monitoring the sensitivity of the film and also in the processing variables involved in the development of the film. The latter variables include the time of development, temperature, agitation, and the concentration or activity of the solutions.

It is particularly important to monitor the film characteristics and processing variables associated with X-ray films. These films frequently involve film-intensifying screen combinations, which are essentially a sandwich of film pressed between one or generally two X-ray-activated phosphor screens. The screens are provided to reduce the total amount of radiation needed to expose the film. As an X-ray beam hits the first screen, the screen emits a light of a particular color that will expose the film. The X-ray beam then passes through the film, adding to the exposure, and then through the second screen to generate an added quantity of light to the exposure. The generation of the light at the screens thus adds to the primary exposure of the film by the X-ray beam itself, and reduces the necessary beam intensity. It is particularly significant that different types of screens emit different colors. Ideally, the sensitometric exposure should simulate the color exposure of the particular screen used in the film being tested, since the sensitometer will not activate the phosphor screens with X-rays.

Presently available sensitometers use filters positioned between a standard light source and the test film, or a variety of colored lamps to affect the desired color change in the exposing light to adapt the test to the particular film sample. The mechanical structure required for these arrangements, together with the time and inconvenience required to change filters or lamps, establishes a need for a simpler approach to the problem of changing the color of the exposing light.

A variety of light sources have been used in sensitometers, among these being electroluminescent panels. These panels have a construction generally similar to that of a capacitor, in that the space between conductive plates is occupied by a dielectric matrix in which phosphor crystals are embedded. The application of alternating current within particular frequency bands will activate the phosphor crystals, and emit light of certain characteristics. This type of lamp has many advantages over other light sources for sensitometry, and has been used for this purpose. It has uniform brightness over a flat area, is dependable, and is inherently thin and vibration resistant. The light intensity can be fully controlled over a considerable range by control of the amplitude of the excitation voltage.

SUMMARY OF THE INVENTION

The present invention utilizes a characteristic of electroluminescent lamps that has not been exploited in sensitometry or related fields. Certain types of these lamps have color response characteristics in which the color of the emitted light can be altered by variation in the excitation frequency. The present invention thus provides a method for controlling the color of the emitted light of a sensitometer, and also provides an instrument having these characteristics. Variation of the excitation frequency is accomplished by a conventional circuit well-known in the electronics art for generating predetermined frequencies or frequency ranges. The quantity of the emitted light of any selected color is preferably controlled by an integration system.

Figure 1:
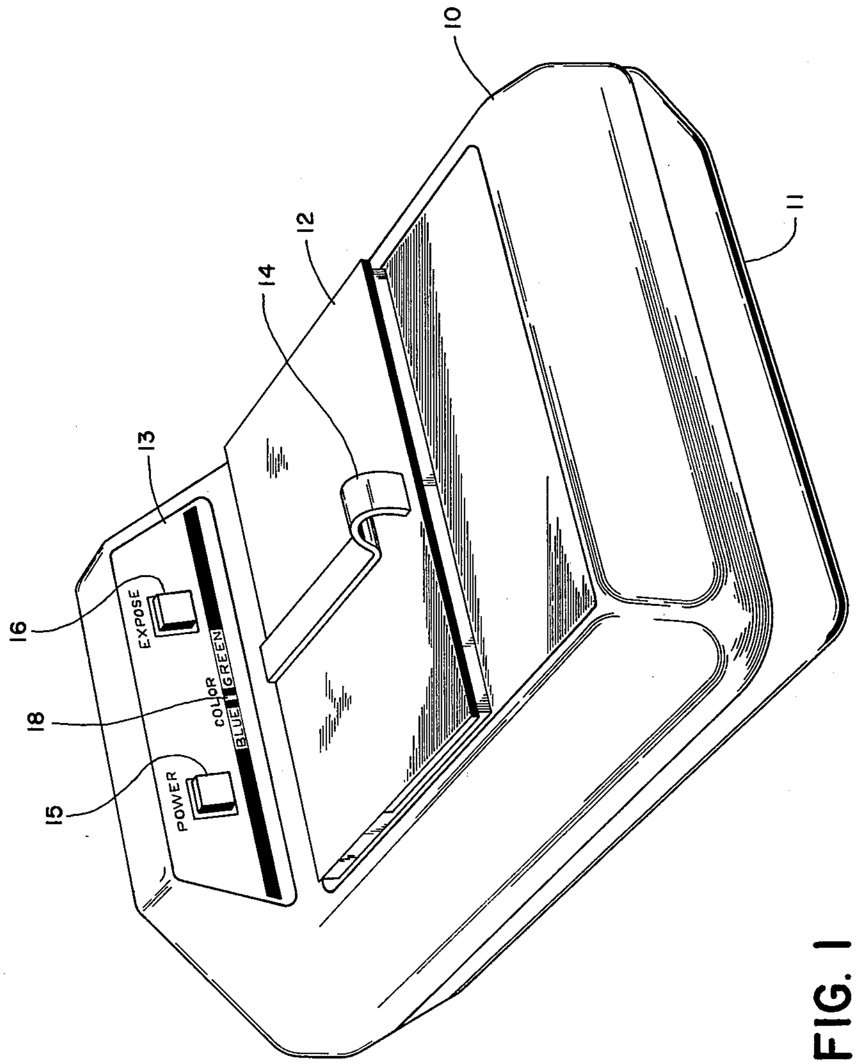
FIG. 1 is a perspective view of an instrument embodying the present invention.

FIGS. *2a* and *2b* are two sections of an exploded view showing the components of the instrument appearing in FIG. 1.

FIG. 3 is a chart showing the relationship of the density and exposure of a typical film.

FIG. 4 is a schematic view showing the functioning relationships within a phosphor crystal.

DESCRIPTION OF THE PREFERRED EMBODIMENTS

Referring to FIG. 1, the illustrated instrument has the upper housing section 10, the lower housing section 11, the cover assembly 12, and the control panel 13. The instrument is used by elevating the cover assembly with the handle 14, placing the film sample underneath it, lowering the cover, and then initiating the exposure by operation of the "power" button 15 and the "expose" button 16. The quantity of light in the exposure pulse is preferably integrated as a function of time and light intensity. The electroluminescent panel 17 (refer to FIG. *2b*) will be energized to produce a pulse of light of a color according to the position of the selector control 18 appearing in FIG. 1. The film is held in position opposite the panel 17 by the pad 19 of the cover assembly 12, which is hinged to the upper housing section as shown at 20 in FIG. *2a.* The electroluminescent panel 17 occupies the area defined by the cut-out 21 in the upper housing section 10. The transparency-gradient "step wedge" plate 22 is superimposed over the electroluminescent plate 17, and forms a receiving surface for the film sample. The strip 23 is interposed between the cover assembly and the member 22 to form a stop to establish the proper placement of the film sample, and may also function as a printed circuit panel for a part of the control system. A magnetic plate 24 is mounted on the bracket 25 secured to the upper housing section along with the hinge 20, and is positioned under the portion of a cover assembly not occupied by the pad 19 to establish a downward force on the cover to apply a gentle pressing action against the film sample. The nameplate 26 is applied over the area indicated at 13 in FIG. *2a,* with the buttons 15 and 16 entering the aligned apertures 27–28 and 29–30, respectively, in the plate 26 and in the housing section 10. The color-selector control is similarly received in the aperture 31 in the plate 26, and 32 in the upper housing section. This switch is indicated at 18.

Figure 2A:
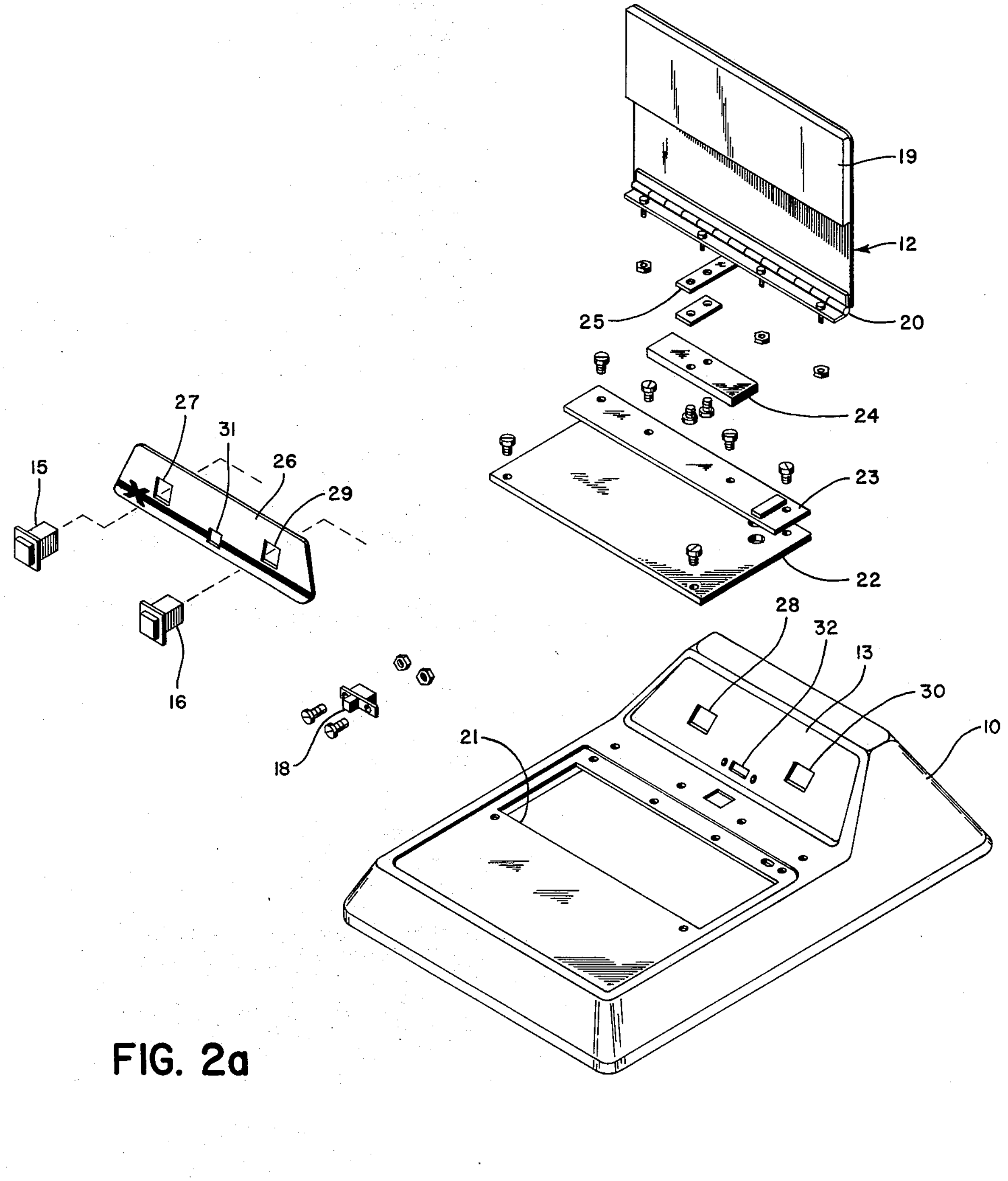
Figure 2B:
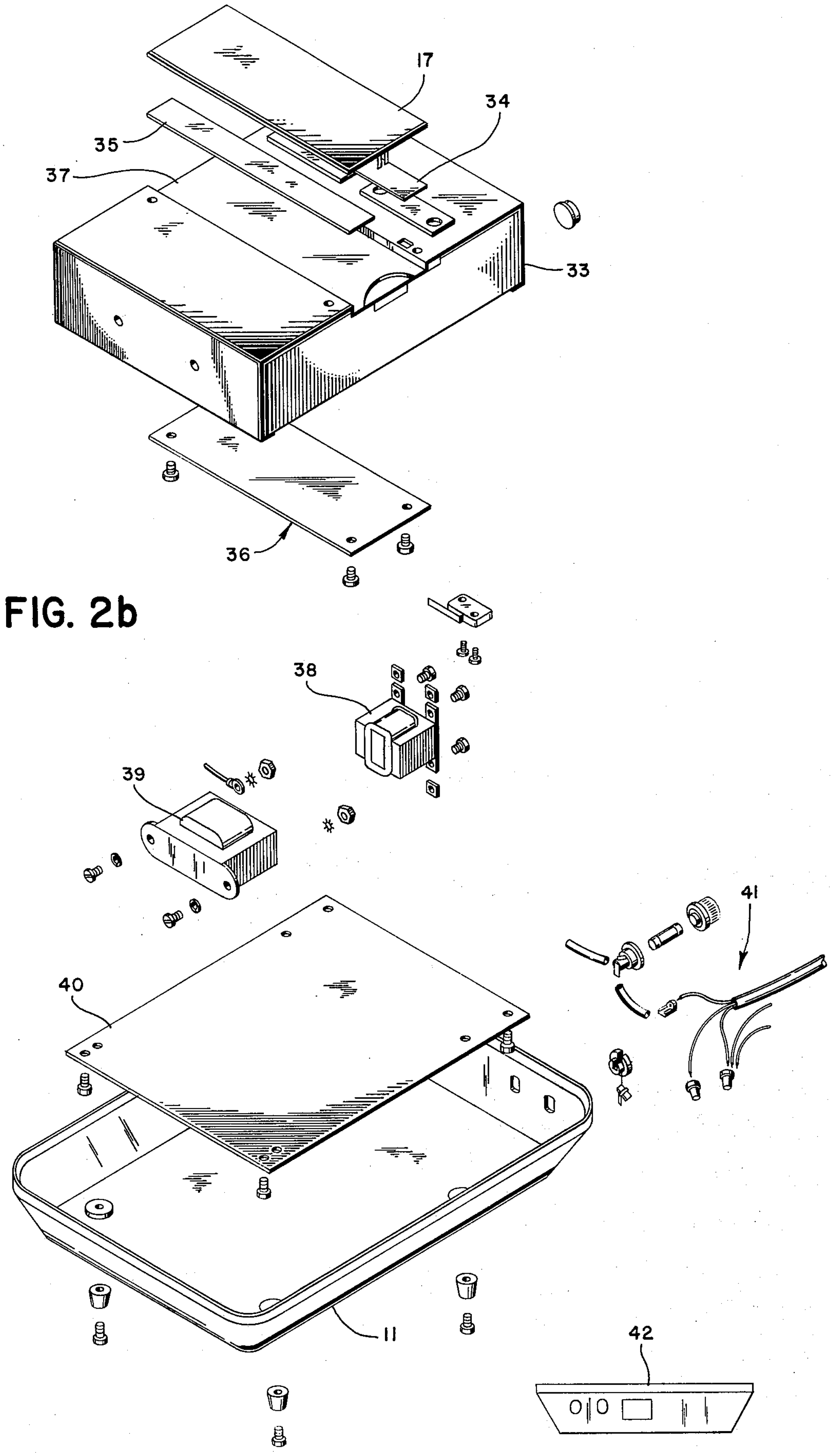

The space within the upper and lower housing units contains the components appearing in FIG. 2*b*. The housing liner 33 supports the electroluminescent panel 17, together with the sealing tape sections 34 and 35. The printed circuit board 36 is secured to the liner unit 33 immediately below the recessed area 37 provided for the plate 17. The board 36, in conjunction with the strip 23, provides standard electronic circuitry for establishing the desired excitation frequencies for the electroluminescent plate 17. The details of these circuits are conventional. The unit 38 is essentially a magnetic flux generator for cooperation with the hold-down magnet 24, and the unit 39 is a transformer associated with the printed circuit panels. The bottom liner sheet 40 isolates the components from the lower section of the housing. The wiring harness items generally indicated at 41 provide for a source of power to the various sections of the circuitry. Standard fastenings and fittings appear in the drawings in their obvious relationship with the respective parts they secure in position. These are not separately referred to in this description. A label plate as shown at 42 may be applied at a convenient position on the housing, if desired.

FIG. 3 illustrates a typical film response curve interrelating density and exposure. Equipment of the type described in this application is used in procuring the data presented in this manner. FIG. 4 is a schematic illustration of the functioning of the electroluminescent phosphor crystals responsible for the light-generating capability of the plate 17. A "host" crystal is provided with impurities referred to as "activators", and the function of an activator can also be provided by imperfections in the lattice structure of the crystal. The crystals themselves are generally the sulfide, selenide, or oxide of zinc or cadmium, and the activators are commonly copper in combination with chlorine, and possibly including one or more of the following: lead, silver or manganese.

The color of the emitted light from an electroluminescent panel is determined by the position of the activator in the "forbidden" band in the crystal structure. Excitation by an applied alternating current voltage produces a burst of light when the potential is applied, and also when it is removed. This results in two bursts of light for each complete cycle of the alternating potential. It is generally agreed that the exciting field accelerates free electrons in the host crystal until a few, with extra acceleration imparted by peculiarities of the crystal lattice, gain sufficient energy to excite the light centers, as represented in FIG. 4, which are the atoms of the activator. Referring to FIG. 4, an electron is accelerated by the applied field into the conduction band. The electron is free to move in conduction band, and lines up with luminous centers. The electron then releases its energy in falling to a luminous center. The energy lost is emitted as a specific color.

The position of the light center determines color emitted. More than one level of activator will enable a phosphor crystal to emit multiple colors as the excitation frequency gives preference to one level over the others, or as one level reaches saturation while the other grows and brightens. A zinc sulfide crystal activated with relatively large amounts of copper in combination with chlorine (and possibly including one or more of the following: lead, silver or manganese) produces an emitted light composed of two major broad component bands: one in the blue centered at 460 millimicrons, and the second in the green centered at 520 millimicrons. The frequency dependence of the two component colors of light from copper activated zinc sulfide are quite different. The blue component increases linearly with increase in the frequency of the alternating current, while the green component reaches saturation at about a thousand cycles. This phenomenon is attributed to the time required to activate the two types of light centers. The time required to activate the blue centers is less than the shortest period encountered, while the saturation of the green band at a thousand Hz indicates an activation time comparable to $10^{-3}$ seconds. This difference explains the color shift and also the saturation effect. If the formulation of the zinc sulfide phosphor is modified to include manganese as well as copper and chloride, the two emission bands due to copper are gradually supressed as the manganese content increases, while a new emission band centered at 590 millimicrons appears. Thus, it is possible to get a continuous shift from green through yellow to orange. As a general rule, the color shifts toward the shorter wave lengths (blue) as the excitation frequency is increased. Phosphors as described above are commercially available. One example is manufactured under the name SYLVANIA type 814 zinc sulfide: copper phosphor. Electroluminescent lamps using these phosphors are also commercially available from companies familiar with this type of equipment.

I claim:

1. A method of test-exposing photographic material having known color-response characteristics, comprising:

applying an alternating current excitation voltage to an electroluminescent plate;

establishing the frequency of said voltage from at least two distinct frequencies each corresponding to a particular color-response characteristic of said plate to excite the entire area of said plate within a color range related to the color-response characteristics of said material; and exposing said material to a pulse of a predetermined quantity of light from said plate.

2. A method as defined in claim 1, wherein said pulse is controlled as an integrated quantity of light intensity with respect to time.

* * * * *